(12) United States Patent
Kedar et al.

(10) Patent No.: US 7,642,328 B2
(45) Date of Patent: *Jan. 5, 2010

(54) PH SENSITIVE MACROMER BASED COPOLYMER AND A PROCESS FOR THE PREPARATION THEREOF

(75) Inventors: Suvarnapathaki Rupali Kedar, Pune (IN); Kulkarni Mohan Gopalkrishna, Pune (IN)

(73) Assignee: Council of Scientific & Industrial Research, New Delhi (IN)

(*) Notice: Subject to any disclaimer, the term of this patent is extended or adjusted under 35 U.S.C. 154(b) by 343 days.

This patent is subject to a terminal disclaimer.

(21) Appl. No.: 11/518,358

(22) Filed: Sep. 7, 2006

(65) Prior Publication Data

US 2007/0073014 A1 Mar. 29, 2007

(30) Foreign Application Priority Data

Sep. 27, 2005 (IN) .................. 2599/DEL/2005

(51) Int. Cl.
*C08F 218/02* (2006.01)
*C08F 26/00* (2006.01)
(52) U.S. Cl. ............... 526/319; 526/310; 526/258; 526/307.2; 526/307.7; 526/219.6
(58) Field of Classification Search .......... 526/319, 526/310, 258, 307.2, 307.7, 219.6
See application file for complete search history.

(56) References Cited

U.S. PATENT DOCUMENTS

| 6,998,456 B1* | 2/2006 | Mallapragada et al. ... | 526/328.5 |
| 2007/0072996 A1* | 3/2007 | Kedar et al. ............... | 525/92 R |

OTHER PUBLICATIONS

Eguiburu et al., Polymer, vol. 37, No. 16, 1996, pp. 3615-3622.*
Park et al., 2000, Macromol. Rapid Commun., 21, No. 8, pp. 464-471.*
Eun Seok Gil and Samuel M. Hudson; Stimuli-Responseive Polymers and their Bioconjugates and Prog. Polym. Sci. 29 (2004) pp. 1173-1222.
S.R. Tonge and B.J. Tighe; Responsive Hydrophobically Associating Polymers: A Review of Structure and Properties; Advanced Drug Delivery Reviews 53 (2001), pp. 109-122.
O.E. Philippova, D. Hourdet, R. Audebert and A.R. Khokhlov; pH-Responsive Gels of Hydrophobically Modified Poly (acrylic acid); Macromolecules 30 (1997), pp. 8278-8285.
V.T. Pinkrah, M.J. Snowden, J.C. Mitchell, J. Seidel, B.Z. Chowdhry and G.R. Fern; Physicochemical Properties of Poly (N-Isopropylacrylamide-co-4-vinylpyridine) Cationic Polyelectrolyte Colloidal Microgels; Langmuir 19 (2003), pp. 585-590).
J. Gohy, B.G.G. Lohmeijer, S.K. Varshney, B. Decamps, E. Leroy, S. Boileau and U.S. Schubert; Stimuli-Responsive Aqueous Micelles from an ABC Metallo-Supramolecular Triblock Copolymer; Macromolecules 35 (2002), pp. 9748-9755).
M.V. Risbud, A.A. Hardikar, S.V. Bhat and R.R. Bhonde; pH-Sensitive Freeze-Dried Chitosan-Polyvinyl Pyrrolidone Hydrogels as Controlled Release System for Antibiotic Delivery; Journal of Controlled Release 68 (2000), pp. 23-30.
Park, Eun Soo; Kim, Hun Sik; Kim, Mal Nam; and Yoon, Jin San; Antibacterial Activities of Polystyrene-block-poly (4-vinyl pyridine) and poly (styrene-random-4-vinyl pyridine); European Polymer Journal, 40(2004), pp. 2819-2822.
Utsumi, Isamu; Ida, Tadao; Takahashi, Shoji; and Sugimoto, Norio; Studies on Protective Coating IX, Polyvinylpyridine Derivatives; Journal of Pharmaceutical Sciences 50 (1961), pp. 592-597.
Lokitz, Brad S.; Ayres, Neil; Convertine, Anthony J.; McCormick, Charles L. Abstracts of Papers, 228th ACS National Meeting, Philadelphia, PA, United States, Aug. 22-26, 2004.
B.L. Funt and E.A. Ogryzlo; Copolymerization of Butyl Acrylate and Vinylpyridine; Journal of Polymer. Science 25, (1957), pp. 279-284.
S.W. Shalaby and R.A. Johnson In: S.W. Shalaby, Editor; Biomedical polymers: Designed to degrade systems, Chapter 1, Carl Hanser Verlag, Munich (1994), pp. 1-34.
R.L. Dunn, Ph.D.: J.O. Hollinger, Editor; Biomedical applications of synthetic biodegradable polymers, Chapter 2, CRC Press, Boca Raton (1995), pp. 17-31.
V. Maquet and R. Jerome; Design of Macroporous Biodegradable Polymer Scaffolds for Cell Transplantation; Materials Science Forum vol. 250 (1997), pp. 15-42.
D.E. Perrin and J.P. English In: A.J. Domb, J. Kost and D.M. Wiseman, Editors, Polyglycolide and Polylactide; Handbook of Biodegradable Polymers, Harwood Academic Publishers, Amsterdam (1997), pp. 3-27.
G. Coullerez, C. Lowe, P. Pechy, H.H. Kausch and J. Hilborn; Synthesis of Acrylate Functional Telephelic Poly (lactic acid) Oligomer by Transesterification; Journal of Materials Science: Mater. Med. 11 (2000), pp. 505-510.
D.K. Han and J.A. Hubbell; Synthesis of Polymer Network Scaffolds from L-Lactide and Poly(ethylene glycol) and Their Interaction with Cells; Macromolecules (1997), pp. 6077-6083.
Matthias Schnabelrauch, Sebastian Vogt, Yves Larcherb and Ingo Wilke; Biodegradable Polymer Networks based on Oligolactide Macromers: Synthesis, Properties and Biomedical Applications; Biomolecular Engineering, 19 (2002), pp. 295-298.
Ryner, M.; Finne, A.; Albertsson, A. C.; and Kricheldorf, H. R.; L-Lactide Macromonomer Synthesis Initiated by New Cyclic Tin Alkoxides Functionalized by Brushlike Structures; Macromolecules 34, (2001) pp. 7281-7287.
Finne, Anna and Albertsson, Ann-Christine; New Functionalized Polyesters to Achieve Controlled Architectures; Journal of Polymer Science, Part A: Polymer Chemistry 42(3), (2004), pp. 444-452.
Zhang, Yeli and Chu, Chih-Chang; Thermal and Mechanical Properties of Biodegradable Hydrophilic-Hydrophobic Hydrogels based on Dextran and Poly (lactic acid); Journal of Materials Science: Materials in Medicine 13 (2002), pp. 773-781.
Wang, Chau-Hui and Hsiue, Ging-Ho; Synthesis and Characterization of Temperature- and pH- Sensitive Hydrogels Based on Poly (2-ethyl-2-oxazoline) and Poly (D,L-Lactide); Journal of Polymer Science, Part A: Polymer Chemistry 40 (8), (2002), pp. 1112-1121.
Haris, Parvez I.; Vogt, S.; Berger, S.; Wilke, I.; Larcher, Y.; Weisser, J.; Schnabelrauch, M.; Design of Oligolactone-Based Scaffolds for Bone Tissue Engineering; Bio-Medical Materials and Engineering 15 (2005), pp. 73-85.
Kari Hiltunen, Mika Harkonen, Jukka Seppala, and Taito Vaananen; Synthesis and Characterization of Lactic Acid Based Telechelic Prepolymers; Macromolecules 29, 1996, pp. 8677-8682.

* cited by examiner

*Primary Examiner*—Satya B Sastri
(74) *Attorney, Agent, or Firm*—Knobbe Martens Olson & Bear LLP

(57) ABSTRACT

The present invention discloses a novel pH sensitive copolymer synthesized from lactide macromers and basic monomers. This composition comprises an acrylate or methacrylate ester of low molecular weight oligomeric lactide copolymerized with basic monomer. These copolymers show pH sensitive dissolution behavior which can be exploited for pharmaceutical applications.

9 Claims, No Drawings

PH SENSITIVE MACROMER BASED COPOLYMER AND A PROCESS FOR THE PREPARATION THEREOF

FIELD OF THE INVENTION

A novel pH sensitive macromer based copolymer and a process for the preparation thereof is provided. In particular, a copolymer comprising an acrylate or methacrylate ester of oligomeric lactide and a basic monomer is provided. These copolymers are soluble in an aqueous system at pH<3 and insoluble at pH>3. The copolymers are pH sensitive and can be used in drug delivery systems.

BACKGROUND OF THE INVENTION pH-responsive conformation with solubility changes is common behavior in biopolymers. The pH-responsive polymers consist of ionizable groups that can accept and donate protons in response to the environmental pH. As the environmental pH changes, the degree of ionization in a polymer bearing weakly ionizable groups is dramatically altered at a specific pH. (Eun Seok Gil, Samuel M. Hudson. Prog. Polym. Sci. 29, (2004) pp. 1173-1222). This rapid change in net charge of pendant groups causes an alteration in the hydrodynamic volume of the polymer chains. The transition from collapsed state to expanded state is due to the osmotic pressure exerted by mobile counter ions neutralizing the network charges (S. R. Tonge, B. J. Tighe, Adv Drug Deliv Rev 53 (2001), pp. 109-122).

The polymers containing ionizable groups in their backbone form polyelectrolytes in the aqueous system. There are two types of pH-responsive polyelectrolytes; weak polyacids and weak polybases. Weak polyacids such as poly(acrylic acid) get ionized at neutral and high pH (O. E. Philippova, D. Hourdet, R. Audebert and A. R. Khokhlov, Macromolecules 30 (1997), pp. 8278-8285). On the other hand, polybases like poly (4-vinylpyridine) get ionized at low pH. (V. T. Pinkrah, M. J. Snowden, J. C. Mitchell, J. Seidel, B. Z. Chowdhry and G. R. Fern, Langmuir 19 (2003), pp. 585-590). These vinyl pyridine polymers undergo a phase transition below pH 5 owing to protonation of pyridine groups (J. Gohy, B. G. G. Lohmeijer, S. K. Varshney, B. Decamps, E. Leroy, S. Boileau and U.S. Schubert, Macromolecules 35 (2002), pp. 9748-9755).

Most pH-responsive polymer systems are designed by combining functional domains to control the pH-responsive properties. Hydrophobically modified pH-responsive polymers have a sensitive balance between charge repulsion and hydrophobic interactions. Weak polybase based hydrogels have been investigated as drug delivery matrices for the release in stomach where the pH is acidic. These hydrogels release drugs at acidic pH in the stomach, because they are swollen.

A pH-sensitive chitosan-poly(Vinyl Pyridine) (PVP), semi-IPN was reported as a controlled release system for antibiotic delivery (M. V. Risbud, A. A. Hardikar, S. V. Bhat and R. R. Bhonde, J Control Release 68 (2000), pp. 23-30.). Antibacterial activities of polystyrene-block-poly(4-vinyl pyridine) and poly(styrene-random-4-vinyl pyridine)copolymers were investigated (Park, Eun Soo; Kim, Hun Sik; Kim, Mal Nam; Yoon, Jin San European Polymer Journal, 40(2004), pp. 2819-2822).

Copolymers of poly(4-vinylpyridine) with methyl acrylate were used as tablet coatings. These coatings required 2-4 hours for disintegration in water and 5-15 minutes for disintegration in artificial gastric juice. (Polymer tablet coatings. Tanabe Seiyaku Co. Ltd. (1959), GB 888131 19590725).

Homopolymers of 2-vinyl-, 4-vinyl-, 2-methyl-5-vinyl-, and 2-vinyl-5-ethylpyridine, were prepared by using either Benzoyl peroxide or potassium persulphate as catalyst. Copolymers of each of these compounds with styrene, vinyl acetate, Methyl acrylate, and acrylonitrile were synthesized. These polymers were excellent carriers for the release in gastric juice. (Utsumi, Isamu; Ida, Tadao; Takahashi, Shoji; Sugimoto, Norio. Journal of Pharmaceutical Sciences 50 (1961), pp. 592-7).

A diblock copolymer of 4-vinyl pyridine (4-VP) and tert-Bu acrylate was polymerized via RAFT. These polymers can serve as protected precursors of block polyampholytes. Upon cleavage of the protecting groups, a block copolymer that was responsive to pH and electrolyte concentration was formed. (Lokitz, Brad S.; Ayres, Neil; Convertine, Anthony J.; McCormick, Charles L. Abstracts of Papers, 228th ACS National Meeting, Philadelphia, Pa., United States, Aug. 22-26, 2004).

The copolymerization of butyl acrylate was carried out with 2- and 4-vinylpyridine. Copolymer compositions were determined spectrophotometrically by monitoring vinyl pyridine absorption at 263 mµ. (Funt, B. L.; Ogryzlo, E. A. J. Polymer. Sci. 25, (1957), pp. 279-84.)

Biodegradable polyesters derived from aliphatic hydroxy carboxylic acids have been developed for medical applications such as surgical sutures, drugh delivery devices, tissue supports, and implants for internal bone fixation [S. W. Shalaby and A. Johnson In: S. W. Shalaby, Editor, Biomedical polymers: Designed-to-degrade systems, Carl Hanser Verlag, Munich (1994), pp. 1-34., R. L. Dunn In: J. O. Hollinger, Editor, Biomedical applications of synthetic biodegradable polymers, CRC Press, Boca Raton (1995), pp. 17-31., V. Maquet and R. Jerome Mater. Sci. Forum 250 (1997), pp. 15-42).

Most of these materials are made from high-molecular-weight linear polyesters like polylactides, polyglycolides and their copolymers (D. E. Perrin and J. P. English In: A. J. Domb, J. Kost and D. M. Wiseman, Editors, Handbook of biodegradable polymers, Harwood Academic Publishers, Amsterdam (1997), pp. 3-27).

Less attention has been paid to oligomeric esters, because these oligomers normally do not have the mechanical and thermal properties required for sutures or implants. Recent work on the synthesis of liquid or low melt oligolactones offers an interesting approach to a new class of biodegradable materials usable for example to produce injectable drug delivery systems, implant coatings or soft tissue augmentations (G. Coullerez, C. Lowe, P. Pechy, H. H. Kausch and J. Hilborn J. Mater. Sci: Mater. Med. 11 (2000), pp. 505-510). In addition, biodegradable polymer networks and composites can be prepared from these oligoesters terminated with unsaturated functional groups (D. K. Han and J. A. Hubbell Macromolecules 30 (1997), pp. 6077-6083).

A series of novel linear and star-shaped oligolactide macromers were prepared and used for the fabrication of highly porous polymer network scaffolds of controlled shape. In vitro studies on the cultivation of osteoblasts on these materials demonstrated that the prepared polymer networks possess excellent biocompatibility and that they are well suited as scaffolds for bone tissue engineering. (Matthias Schnabelrauch, Sebastian Vogta, Yves Larcherb and Ingo Wilkeb Biomolecular Engineering, 19 (2-6), (2002), pp. 295-298).

Cyclic tin alkoxides were used to initiate controlled ring-opening polymerization (ROP) of L-Lactide, yielding a series of lactide macromonomers. Double bond of the initiator was successfully incorporated into the synthesized macromonomers which is well-suited for postpolymerization into a brush like polymer. (Ryner, M.; Finne, A.; Albertsson, A. C.; Kricheldorf, H. R. Macromolecules 34, (2001), pp. 7281-7287.) This unsaturated macromonomer provided a variety of opportunities for further modifications. The incorporated C=C double bond was oxidized into epoxies. (Finne, Anna; Albertsson, Ann-Christine. Journal of Polymer Science, Part A: Polymer Chemistry 42(3), (2004), pp. 444-452)

Poly (D, L) lactide diacrylate macromer was used to develop a new family of biodegradable hydrogels with photocrosslinked dextran derivative of allyl isocyanate. The changes in thermal and mechanical properties of these hydrogels as function of dextran and lactide macromer composition were investigated. (Zhang, Yeli; Chu, Chih-Chang. Journal of Materials Science: Materials in Medicine 13(8), (2002), pp. 773-781).

A series of temperature and pH-sensitive hydrogels based on poly (2-ethyl-2-oxazoline) and three-arm poly (D, L-lactide) macromer were synthesized via photo-copolymerization. Lactide macromer was synthesized by first reacting lactide with Glycerol and then reacting the three arm polylactide with methacryloyl chloride and triethylamine. (Wang, Chau-Hui; Hsiue, Ging-Ho. Journal of Polymer Science, Part A: Polymer Chemistry 40(8), (2002), pp. 1112-1121). Novel difunctional oligolactone macromers have been synthesized by ring-opening oligomerization of various lactones (L-lactide, glycolide, p-dioxanone) in the presence of suitable diols (propane-1, 2-diol, dianhydro-D-glucitol) and subsequent end capping of the formed oligolactones with methacrylate moieties. Highly porous scaffolds were fabricated from these macromers. The oligolactide based polymer networks possess excellent biocompatibility and are promising candidates as scaffolds in bone tissue engineering. (Haris, Parvez I.; Vogt, S.; Berger, S.; Wilke, I.; Larcher, Y.; Weisser, J.; Schnabelrauch, M. Bio-Medical Materials and Engineering 15(1, 2), (2005), pp. 73-85)

To date much work has been done on copolymerization of acrylate monomers with polyacids or polybases to get pH sensitive polymers. Such copolymers are high molecular weights and they are being used in variety of applications described above. Methacrylate oligomers and unsaturated lactide oligomers were synthesized to obtain low molecular weight macromers of lactide and were used as biodegradable drug delivery systems after proper modification. Mainly they were cross linked with suitable monomers to get hydrogels and their biodegradability and swelling behavior was studied. Scaffolds were also designed and were investigated for their biocompatibility. But no effort was made to copolymerize lactide macromer with polybases or polyacids to get pH sensitive polymers of low molecular weight.

SUMMARY OF THE INVENTION

The preferred embodiments provide composition of a low molecular weight copolymer synthesized using oligomeric lactide and a basic monomer. It also demonstrates that at very low concentration of the basic monomer used in this composition (about 1% w/w), the copolymer is pH sensitive. The copolymers are only soluble at acidic pH (<3) and are insoluble above that. These copolymers can be considered as lactide macromer modified pH sensitive polymers which respond to particular pH and hence can be used to design drug delivery systems depending on their dissolution behavior.

The preferred embodiments provide a novel pH sensitive copolymer.

A process for the preparation of a pH sensitive copolymer by polymerization of acrylate or methacrylate ester of oligomeric lactide with basic monomer is provided.

Accordingly the preferred embodiments provide a novel pH sensitive macromer based copolymer having the general formula $$[A_{(x)} B_{(y)}]_n$$

wherein macromer A is an oligomeric lactide macromer having a degree of polymerization in the range of 4 to 12, B is a basic monomer, x varies from 2 to 6, and y varies from 5 to 50 and n varies from 3 to 13.

In a preferred embodiment, the copolymer obtained is characterized in that it is soluble in an aqueous medium at a pH≦3.

In another preferred embodiment, the copolymer obtained is characterized in that it has a molecular weight in the range of 900 to 8000.

In yet another preferred embodiment the content of the oligomeric lactide macromer present is in the range of 30 to 99% w/w of the copolymer.

In yet another preferred embodiment the content of the basic monomer present is in the range of 1 to 70% w/w of the copolymer.

In yet another preferred embodiment the macromer A used is an acrylic or methacrylic acid ester of oligomeric lactide selected from oligo(lactide)acrylate and oligo(lactide)methacrylate.

In yet another preferred embodiment the macromer A used has a molecular weight in the range of 500 to 2000.

In yet another preferred embodiment the basic monomer (B) used is an alkenyl pyridine selected from the group consisting of 2 vinyl pyridine, 3-vinyl pyridine, 4-vinyl pyridine and 5-vinyl 2 picoline, 2-vinyl 4 picoline, 2 isopropenyl pyridine, 3 isopropenyl pyridine and 3 isopropenyl pyridine.

The preferred embodiments further provide a process for the preparation of a novel pH sensitive macromer based copolymer having the general formula $$[A_{(x)} B_{(y)}]_n$$

wherein macromer A is an oligomeric lactide macromer having a degree of polymerization in the range of 4 to 12, B is a basic monomer, x varies from 2 to 6, and y varies from 5 to 50 and n varies from 3 to 13, which comprises which comprises preparing a solution of a macromer A and a basic monomer B in an organic solvent, adding a free radical initiator to above said solution mixture and heating it to a temperature ranging between 50 to 75° C., for a period of 16 to 24 hours, concentrating the above said reaction mixture by removing the solvent, at a reduced pressure and precipitating the resultant reaction mixture in water to recover the desired copolymer.

In yet another preferred embodiment the macromer A used is an acrylic or methacrylic acid ester of oligomeric lactide selected from oligo(lactide)acrylate and oligo(lactide)methacrylate.

In yet another preferred embodiment the macromer A used has a molecular weight in the range of 500 to 2000.

In yet another preferred embodiment the basic monomer (B) used is an alkenyl pyridine selected from the group consisting of 2 vinyl pyridine, 3-vinyl pyridine, 4-vinyl pyridine and 5-vinyl 2 picoline, 2-vinyl 4 picoline, 2 isopropenyl pyridine, 3 isopropenyl pyridine and 3 isopropenyl pyridine.

In yet another preferred embodiment the organic solvent used for the polymerization is selected from the group consisting of chlorinated hydrocarbon, alcohol, ester, ketone, formamide, tetrahydrofuran, dioxane and dimethyl sulfoxide.

In yet another preferred embodiment the free radical initiator used is selected from the group consisting of azo compound, peroxide, hydroperoxide, peracid and perester.

In yet another preferred embodiment the azo compound used is selected from the group consisting of azo-bis-cyano-valeric acid, azo-bis-biphenyl methane, azo-bis-methyl isobutyrate and azo-bis-isobutyronitrile.

In yet another preferred embodiment the copolymer obtained is soluble in an aqueous medium at a pH$\leq$3.

In yet another preferred embodiment the copolymer obtained has a molecular weight in the range of 900 to 8000.

In yet another preferred embodiment the copolymer obtained has a content of the oligomeric lactide macromer in the range of 30 to 99% w/w of the copolymer.

In yet another preferred embodiment the copolymer obtained has a content of the basic monomer in the range of 1 to 70% w/w of the copolymer.

DETAILED DESCRIPTION OF THE PREFERRED EMBODIMENT

High-molecular-weight linear polyesters like polylactides, polyglycolides and their copolymers are widely used for medical applications such as surgical sutures, drug delivery devices, tissue supports, and implants for internal bone fixation. But less attention has been paid to lactide oligomers as they lack mechanical and thermal properties required for above applications.

These low molecular weight oligolactides can be looked upon as a new class of biodegradable materials useful in injectable drug delivery systems, implant coatings or soft tissue augmentations. The preferred embodiments relate to the synthesis of pH sensitive lactide copolymers from low molecular weight lactide macromer and basic monomer. The different copolymer compositions of the preferred embodiments can be obtained by varying two principal factors in the process.

1. The molecular weight of lactide macromer.
2. Composition of macromer and basic monomer in feed during polymerization In the preferred embodiments the lactide macromer (A) is synthesized from oligo (lactide) diol by condensation reaction with acryloyl chloride or methacryloyl chloride using triethyl amine as base. (Haris, Parvez I.; Vogt, S.; Berger, S.; Wilke, I.; Larcher, Y.; Weisser, J.; Schnabelrauch, M. Bio-Medical Materials and Engineering, 15(1, 2), (2005), pp. 73-85).

This macromer can be also synthesized by coupling oligomeric diol with acrylic acid or methacrylic acid using Dicyclohexyl carbodiimide.

Oligomeric lactide diol is an oligomeric lactide having terminal hydroxyl groups which is synthesized from Lactide and 1, 4 Butanediol by ring opening melt polymerization. (Kari Hiltunen, Mika Harkonen, Jukka Seppala, Taito Vaananen Macromolecules 29, (1996), pp. 8677-8682). This oligo (lactide) diol is then dissolved in tetrahydrofuran to which acryloyl chloride was added drop by drop under Nitrogen atmosphere. The product is recovered by removing salt by filtration. Then macromer is precipitated in non-solvent like water and dried at room temperature. This macromer is then used for polymerization reaction.

The solution polymerization technique is used for polymerization of oligomeric lactide macromer with basic monomer. In solution polymerization the macromer and basic monomer are dissolved in the solvent and the initiator is dissolved in that solvent. Azo-bis-isobutyronitrile is used as initiator for polymerization. Reaction mixture is purged with Nitrogen and the reaction was carried out under inert atmosphere. After stipulated reaction time, solvent is evaporated under reduced pressure and the polymer is precipitated from the solution, by precipitating in nonsolvents like water, petroleum ether or diethyl ether. The polymer is then dried under vacuum.

The dissolution behavior of the polymers synthesized was studied by exposing the polymers to buffer solutions of different pH range. Dry polymers were put in different buffers to study solubilization or swelling. 50 mg polymer of each composition was put in separate test tubes in 5 ml buffer of different pH. Dissolution behavior of the polymers is described in table 1, 2, 3, and 4.

The preferred embodiments are now illustrated by examples which are representative only and do not in any way limit the scope of the invention.

EXAMPLE 1

This example provides for the copolymer of oligo (Lactide) acrylate with 4-Vinyl pyridine in which lactide macromer mol. wt. was 614

1.12 g ($1.82 \times 10^{-3}$ moles) oligo (Lactide) acrylate was dissolved in 15 ml Dimethyl formamide to which 0.77 g ($7.29 \times 10^{-3}$ moles) of 4-Vinyl pyridine was added. The initiator azo bis Isobutyronitrile 0.0299 g ($1.82 \times 10^{-4}$ moles) was added to it. This reaction mixture was stirred well and nitrogen was purged through it for 10 minutes. This was heated for 24 hours at 65° C. in a water bath. After stipulated reaction time, solvent was removed under reduced pressure and was precipitated in water. Polymer was dried under vacuum and characterized by NMR and VPO.

(NMR signals for the copolymer: NMR was recorded in deuterated chloroform Signal for 2 protons of 2(—CH) for 4-Vinyl pyridine appeared at 8.35 and it was compared for integration with 2 protons of 2(—CH) at 5.16 for lactide Also peak for 6 protons of lactide appeared at 1.56

EXAMPLE 2

This example provides for the copolymer of oligo (Lactide) acrylate with 4-Vinyl pyridine in which lactide macromer mol. wt. was 1415.

1.0 g ($7.06 \times 10^{-4}$ moles) oligo (Lactide) acrylate was dissolved in 15 ml Dimethyl formamide to which 0.984 g ($9.38 \times 10^{-3}$ moles) of 4-Vinyl pyridine was added. The initiator azo bis Isobutyronitrile 0.0331 g ($2.01 \times 10^{-4}$ moles) was added to it. This reaction mixture was stirred well and nitrogen was purged through it for 10 minutes. This was heated for 18 hours at 70° C. in a water bath. After stipulated reaction time, solvent was removed under reduced pressure and the polymer was precipitated in water. Polymer was dried under vacuum and characterized by NMR and VPO.

EXAMPLE 3

This example provides for the copolymer of oligo (Lactide) acrylate with 4-Vinyl pyridine in which 4-vinyl pyridine content was 66% w/w.

1.2 g ($1.84 \times 10^{-3}$ moles) oligo (Lactide) acrylate was dissolved in 15 ml Dimethyl formamide to which 3.70 g (0.035 moles) of 4-Vinyl pyridine was added. The initiator azo bis Isobutyronitrile 0.121 g ($7.36 \times 10^{-4}$ moles) was added to it. This reaction mixture was stirred well and nitrogen was purged through it for 10 minutes. This was heated for 20 hours at 60° C. in a water bath. After stipulated reaction time, solvent was removed under reduced pressure and the polymer precipitated in water. Polymer was dried under vacuum and characterized by NMR and VPO.

EXAMPLE 4

This example provides for the copolymer of oligo (Lactide) acrylate with 4-Vinyl pyridine in which 4-vinyl pyridine content was 1% w/w.

1.0 g ($1.42 \times 10^{-3}$ moles) oligo (Lactide) acrylate was dissolved in 15 ml Dimethyl formamide to which 0.224 g ($2.13 \times 10^{-3}$ moles) of 4-Vinyl pyridine was added. The initiator azo bis Isobutyronitrile 0.0116 g ($7.1 \times 10^{-5}$ moles) was added to it. This reaction mixture was stirred well and nitrogen was purged through it for 10 minutes. This was heated for 22 hours at 55° C. in a water bath. After stipulated reaction time, solvent was removed under reduced pressure and was precipitated in water. Polymer was dried under vacuum and characterized by NMR and VPO.

EXAMPLE 5

This example provides for the copolymer of oligo (Lactide) methacrylate with 4-Vinyl pyridine.

1.0 g ($1.33 \times 10^{-3}$ moles) oligo (Lactide) methacrylate was dissolved in 15 ml Dimethyl formamide to which 1.26 g (0.012 moles) of 4-Vinyl pyridine was added. The initiator azo bis Isobutyronitrile 0.0043 g ($2.66 \times 10^{-4}$ moles) was added to it. This reaction mixture was stirred well and nitrogen was purged through it for 10 minutes. This was heated for 20 hours at 65° C. in a water bath. After stipulated reaction time, solvent was removed under reduced pressure and the polymer was precipitated in water. Polymer was dried under vacuum and characterized by NMR and VPO.

VPO used for molecular weight measurement of all these copolymers was KNAUER K 7000 series and chloroform (HPLC grade) was used as solvent.

TABLE 2

Dissolution behavior of polymers in acidic buffer
Composition—oligo (lactide) acrylate:4vinyl pyridine

| Molecular weight of oligo (lactide) acrylate | Composition of the copolymer (in moles) | | VP content % w/w | Molecular weight of copolymer | Dissolution behavior in acidic buffer pH 1.8 |
| --- | --- | --- | --- | --- | --- |
| | In feed | By NMR | | | |
| 920 | 02:98 | 12:88 | 45 | 5826 | Polymer swelled marginally and dissolved in 2 hours |
| 790 | 02:98 | 16:84 | 41 | 7861 | Polymer swelled and dissolved in 90 minutes |
| 790 | 05:95 | 20:80 | 34 | 6524 | Polymer swelled marginally and dissolved in about 2 hours |
| 790 | 08:92 | 26:74 | 27 | 6180 | Polymer swelled Marginally and dissolved in 1 hour |
| 790 | 10:90 | 38:62 | 18 | 6539 | Polymer swelled and dissolved in 1 hour |
| 614 | 07:93 | 43:57 | 18 | 7643 | Polymer swelled after 20 minutes, it did not dissolve |
| 920 | 05:95 | 36:64 | 17 | 5270 | Polymer did not swell, it dissolved in 90 minutes |
| 790 | 15:85 | 53:47 | 11 | 5387 | No swelling, soluble in 45 minutes |
| 614 | 20:80 | 68:32 | 07 | 1790 | Swelled marginally and dissolved in 2 hours |

TABLE 1

Dissolution behavior of polymers in acidic buffer
Composition—oligo (lactide) acrylate:4vinyl pyridine

| Molecular weight of oligo (lactide) acrylate | Composition of the copolymer (in moles) | | VP content % w/w | Mol. Wt. of copolymer | Dissolution behavior in acidic buffer pH 1.8 |
| --- | --- | --- | --- | --- | --- |
| | In feed | By NMR | | | |
| 650 | 5:95 | 7:93 | 66 | 7916 | Polymer swelled within 1 hour and remained swelled even after 24 hours, it did not dissolve |
| 700 | 10:90 | 41:59 | 18 | 7451 | Polymer swelled significantly in 1 hour and dissolved completely after 24 hours |
| 750 | 20:80 | 53:47 | 11 | 4760 | Polymer swelled within 30 minutes and dissolved partly after 24 hours |
| 700 | 20:80 | 58:42 | 09 | 1607 | Polymer swelled within 1 hour and then dissolved completely after 4 hours |
| 700 | 30:70 | 78:22 | 04 | 1119 | Polymer dissolved within 30 minutes |
| 700 | 40:60 | 93:07 | 01 | 1058 | Polymer dissolved within 15 minutes |
| 700 | 60:40 | 94:06 | 0.9 | 1015 | Polymer dissolved within 15 minutes |
| 700 | 50:50 | 99:01 | 0.15 | 980 | Polymer did not dissolve |

All oligo (lactide) acrylate copolymers did not swell or dissolve in buffers of pH 4.8, 6.8 or 10.

TABLE 3

Dissolution behavior of polymers in acidic buffer
Composition—oligo (Lactide) acrylate:Vinyl pyridine

| Molecular weight of oligo (lactide) acrylate | Composition of the copolymer (in moles) | | VP content % w/w | Molecular weight of copolymer | Dissolution behavior in acidic buffer pH 1.8 |
|---|---|---|---|---|---|
| | In Feed | By NMR | | | |
| 1300 | 4:96 | 17:83 | 30 | 3531 | Polymer dissolved in 1 hour |
| 1415 | 5:95 | 21:79 | 25 | 2650 | Polymer dissolved in 20 minutes |
| 1415 | 7:93 | 29:71 | 18 | 2558 | Polymer dissolved in 10 minutes |
| 1415 | 10:90 | 42:58 | 11 | 2507 | Polymer dissolved in 10 minutes |
| 1300 | 15:85 | 53:47 | 07 | 2321 | Polymer dissolved in 5 minutes |

TABLE 4

Dissolution behavior of polymers in acidic buffer
Composition—oligo (lactide) methacrylate:4 vinyl pyridine

| Molecular weight of oligo (lactide) methacrylate | Composition of the copolymer (in moles) | | VP content % w/w | Molecular weight of copolymer | Dissolution behavior in acidic buffer pH 1.8 |
|---|---|---|---|---|---|
| | In feed | By NMR | | | |
| 750 | 05:95 | 8:92 | 62 | 6859 | Polymer dissolved in 2 hours |
| 750 | 10:90 | 24:76 | 31 | 4166 | Polymer dissolved in 90 minutes |
| 750 | 15:85 | 37:63 | 19 | 1784 | Polymer dissolved in 90 minutes |
| 750 | 20:80 | 47:53 | 14 | 1530 | Polymer dissolved in 45 minutes |
| 750 | 25:75 | 49:51 | 13 | 1472 | Polymer dissolved in 30 minutes |

All oligo (lactide) methacrylate copolymers did not swell or dissolve in buffers of pH 4.8, 6.8 or 10.

All references cited herein, including but not limited to published and unpublished applications, patents, and literature reference, are incorporated herein by reference in their entirety and are hereby made a part of this specification. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

All numbers expressing quantities of ingredients, reaction conditions, and so forth used in the specification are to be understood as being modified in all instances by the term "about." Accordingly, unless indicated to the contrary, the numerical parameters set forth herein are approximations that may vary depending upon the desired properties sought to be obtained. At the very least, and not as an attempt to limit the application of the doctrine of equivalents to the scope of any claims in any application claiming priority to the present application, each numerical parameter should be construed in light of the number of significant digits and ordinary rounding approaches.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention.

What is claimed is:

1. A pH sensitive macromer based copolymer having a general formula $[A_{(x)}B_{(y)}]_n$ wherein A is an oligomeric lactide macromer selected from the group consisting of oligo (lactide) acrylate and oligo (lactide) methacrylate and having a degree of polymerization of from 4 to 12; B is a basic monomer wherein the basic monomer is an alkenyl pyridine selected from the group consisting of 2 vinyl pyridine, 3-vinyl pyridine, 4-vinyl pyridine and 5-vinyl 2 picoline, 2-vinyl 4 picoline, 2 isopropenyl pyridine and 3 isopropenyl pyridine; x is from 2 to 6; y is from 5 to 50; and n is from 3 to 13, wherein the copolymer has a molecular is from 900 to 8000, wherein a molecular weight of oligomeric lactide macromer is from 500 to 2000, and wherein the copolymer is soluble in an aqueous medium at a pH≦3.

2. The copolymer of claim 1, wherein a content of the oligomeric lactide macromer present is from 30% w/w to 99% w/w of the copolymer.

3. The copolymer of claim 1, wherein a content of the basic monomer present is from 1% w/w to 70% w/w of the copolymer.

4. A process for the preparation of a pH sensitive macromer based copolymer, which comprises:

preparing a solution of an oligomeric lactide macromer selected from the group consisting of oligo (lactide) acrylate and oligo (lactide) methacrylate and having a degree of polymerization of from 4 to 12 and a basic monomer wherein the basic monomer is an alkenyl pyridine selected from the group consisting of 2 vinyl pyridine, 3-vinyl pyridine, 4-vinyl pyridine and 5-vinyl 2 picoline, 2-vinyl 4 picoline, 2 isopropenyl pyridine and 3 isopropenyl pyridine; in an organic solvent;

adding a free radical initiator to the solution and heating the solution to a temperature of from 50 to 75° C., for a period of from 16 to 24 hours, whereby a reaction mixture is obtained;

concentrating the reaction mixture by removing the organic solvent, at a reduced pressure; and precipitating the concentrated reaction mixture in water to recover the copolymer, wherein the polymer has a general formula:

$[A_{(x)}B_{(y)}]_n$ wherein A is the oligomeric lactide macromer; B is the basic monomer; x is from 2 to 6; y is from 5 to 50; and n is from 3 to 13, wherein the copolymer has a molecular weight of from 900 to 8000, wherein a molecular weight of oligomeric lactide macromer is from 500 to 2000, and wherein the copolymer is soluble in an aqueous medium at a pH≦3.

5. The process of claim 4, wherein the organic solvent is selected from the group consisting of chlorinated hydrocarbon, alcohol, ester, ketone, formamide, tetrahydrofuran, dioxane, and dimethyl sulfoxide.

6. The process of claim 4, wherein the free radical initiator is selected from the group consisting of azo compound, peroxide, hydroperoxide, peracid, and perester.

7. The process of claim 6, wherein the azo compound is selected from the group consisting of azo-bis-cyano-valeric acid, azo-bis-biphenyl methane, azo-bis-methyl isobutyrate, and azo-bis-isobutyronitrile.

8. The process as claimed in claim 4, wherein the copolymer has a content of oligomeric lactide macromer of from 30% w/w to 99% w/w of the copolymer.

9. The process of claim 4, wherein the copolymer has a content of the basic monomer of from 1% w/w to 70% w/w of the copolymer.

* * * * *

UNITED STATES PATENT AND TRADEMARK OFFICE
CERTIFICATE OF CORRECTION

PATENT NO. : 7,642,328 B2 Page 1 of 1
APPLICATION NO. : 11/518358
DATED : January 5, 2010
INVENTOR(S) : Suvarnapathaki Rupali Kedar et al.

It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 343 days.

Delete the phrase "by 343 days" and insert --by 463 days--.

On title page, column 1, item 56, line 4, under Other Publications, please change "Responseive" to --Responsive--.

Col. 2, line 28, please change "drugh" to --drug--.

Col. 3, line 9, after "452)" please insert --.--.

Col. 3, line 37, after "85)" please insert --.--.

Col. 5, line 40, after "polymerization" please insert --.--.

Col. 6, line 22, after "614" please insert --.--.

Col. 6, line 36, please change "lactide Also" to --lactide. Also--.

Col. 6, line 37, after "1.56" please insert --.--.

Signed and Sealed this

Seventh Day of September, 2010

David J. Kappos
*Director of the United States Patent and Trademark Office*